UNITED STATES PATENT OFFICE.

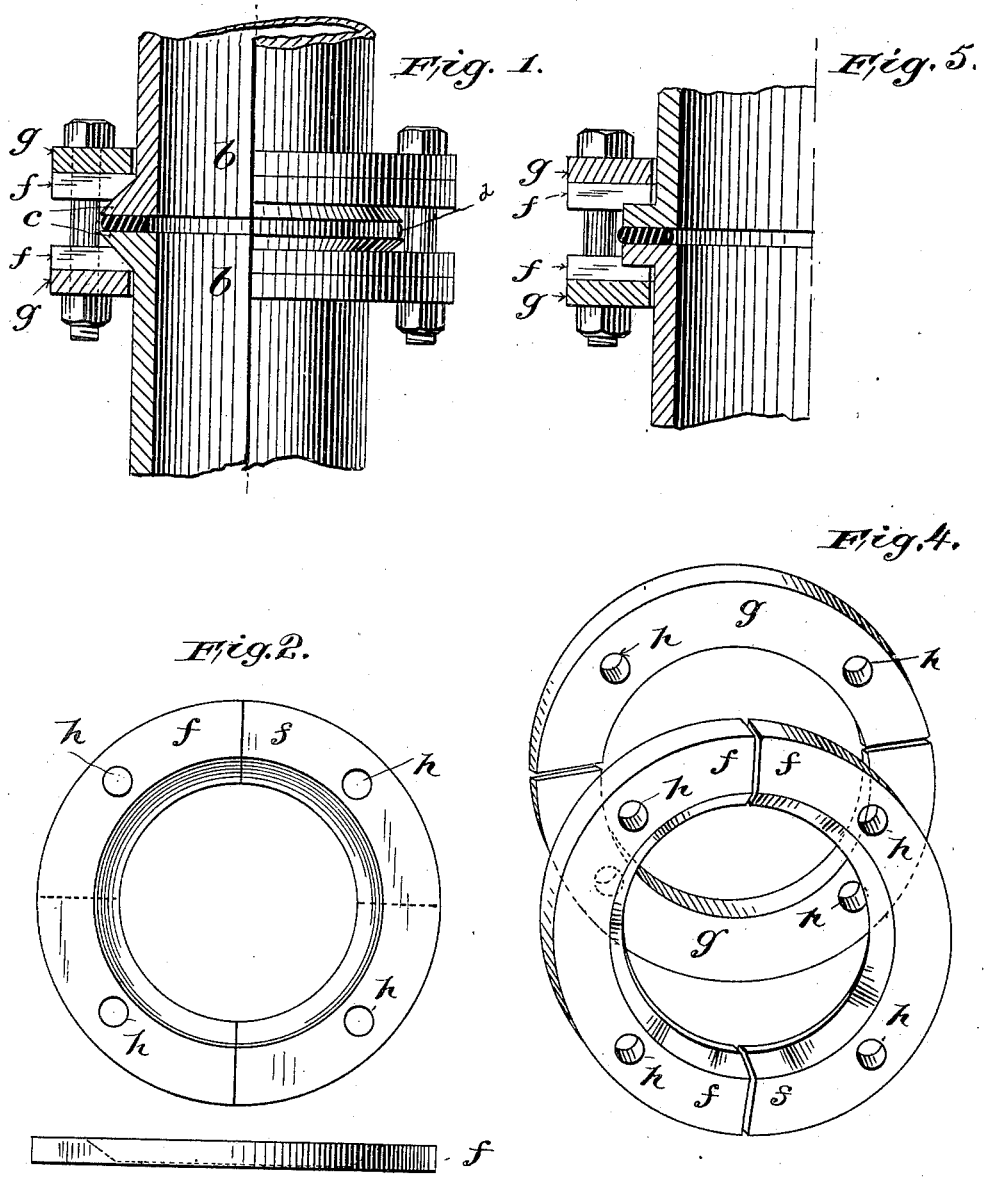

MAX MAURAN, OF NIAGARA FALLS, NEW YORK, ASSIGNOR, BY MESNE ASSIGNMENTS, TO CASTNER ELECTROLYTIC ALKALI COMPANY, OF VIRGINIA.

PIPE-COUPLING.

SPECIFICATION forming part of Letters Patent No. 674,928, dated May 28, 1901.

Application filed March 22, 1900. Serial No. 9,681. (No model.)

*To all whom it may concern:*

Be it known that I, MAX MAURAN, engineer, a citizen of the United States, with residence and post-office address at Niagara Falls, in the county of Niagara and State of New York, have invented certain new and useful Improvements in Pipe-Couplings, of which the following is a specification accompanied by drawings.

The invention is particularly adapted for coupling non-corrosive pipes for acids and alkalies. Great difficulty is found in producing a coupling which may be reliably tight and at the same time readily coupled and uncoupled.

The object of the present invention is to accomplish this result in a simple and economical manner.

The invention will be readily understood from a description of the accompanying drawings, wherein—

Figure 1 is a view, half in section, of a pipe and pipe-coupling constructed under my invention. Fig. 2 is a face view of one of the double members. Fig. 3 is an edge view of the same, showing the member slightly separated; and Fig. 4 is a view similar to Fig. 2 with the four parts of the member slightly displaced, so as to show their relation. Fig. 5 is a modification.

Throughout the figures like reference-letters refer to like parts.

The abutting ends of two pipes $b$, of vulcanite or other suitable non-corrosive material, are brought together, as in Fig. 1, and are constructed with the flaring or conical ends, as shown at $c$. Between the abutting ends of the pipes I place a ring of suitable packing $d$, and I then apply my coupling-irons, which effect the drawing together of the abutting ends of the pipe and the consequent compression of the packing $d$ between them until there is no chance for leakage and a very firm joint is obtained. The coupling-irons consist of two members, one for each pipe end, and each member consists of four semicircular pieces $ff$ and $gg$, provided with registering bolt-holes $h$. The pieces $ff$ together form a ring broken at two points and internally tapered or flared, so as to fit the surface $c$ of each pipe $b$. The parts $g$ are of the same external radius as the parts $f$ and internally are fitted to conform to the portion of the pipe $b$ or the smaller portions of the surface $c$ immediately behind the parts $f$. Four of the half-rings $ff$ and $gg$ are placed together in the overlapping manner diagrammatically indicated in Fig. 4, surrounding one pipe end $b$. Four bolts are passed through the bolt-holes $h$. Thereupon the opposing member, also consisting of two divided rings $ff$ and $gg$, is placed upon the opposing pipe end $b$ and strung onto the bolts. Then, the packing-ring $d$ being in place, the nuts are placed on the bolts and screwed up, drawing the opposed pairs of rings together and simultaneously centering the ends of the two pipes and pressing them strongly together, so as to make a tight joint.

The advantages of this form of coupling are obvious over many forms now in use. Its extreme simplicity and the ease with which it may be put in place or entirely removed from a pipe are remarkable.

Certain features of the invention may be utilized without others and without accomplishing the entire purpose of the invention. For example, if the opposing pairs of rings $f$ are drawn very nearly together it is possible, though less advantageous, to omit the rings $g$, for the two rings $f$ if drawn very closely together and placed so as to break joints will hold together on the flaring or flanged surfaces $c$ without great trouble; but I of course do not recommend such a procedure.

Having now described the form of the invention as I prefer to utilize it, I claim as the characteristic novelties of my invention the following:

1. In combination with two pipe ends having flared or enlarged tapered ends, two overlying divided rings on each of the said ends, with their divisions breaking joints or overlapped, and resting against the flared or tapered surface, and means for drawing the said rings together and thereby pressing the pipe ends together, substantially as set forth.

2. In combination with two pipe ends having flared or flanged ends, four half-rings forming two complete overlying divided rings on each of the said ends, with their divisions breaking joints or overlapped, and resting against the flared or tapered surface, and means for drawing the said rings together and thereby pressing the pipe ends together, substantially as set forth.

3. In combination with two pipe ends having flared or flanged ends, two complete overlying divided rings on each of the said ends, with their divisions breaking joints or overlapped, and resting against the flared or tapered surface, and means for drawing the said rings together and thereby pressing the pipe ends together, substantially as set forth.

Signed this 28th day of February, 1900, at the city of Niagara Falls, New York.

MAX MAURAN.

Witnesses:
EUGENE R. WHITE,
G. M. TUTTLE.